No. 657,222. Patented Sept. 4, 1900.
I. KITSEE.
WIRELESS OR SPACE TELEGRAPHY.
(Application filed May 20, 1899. Renewed Mar. 12, 1900.)
(No Model.)
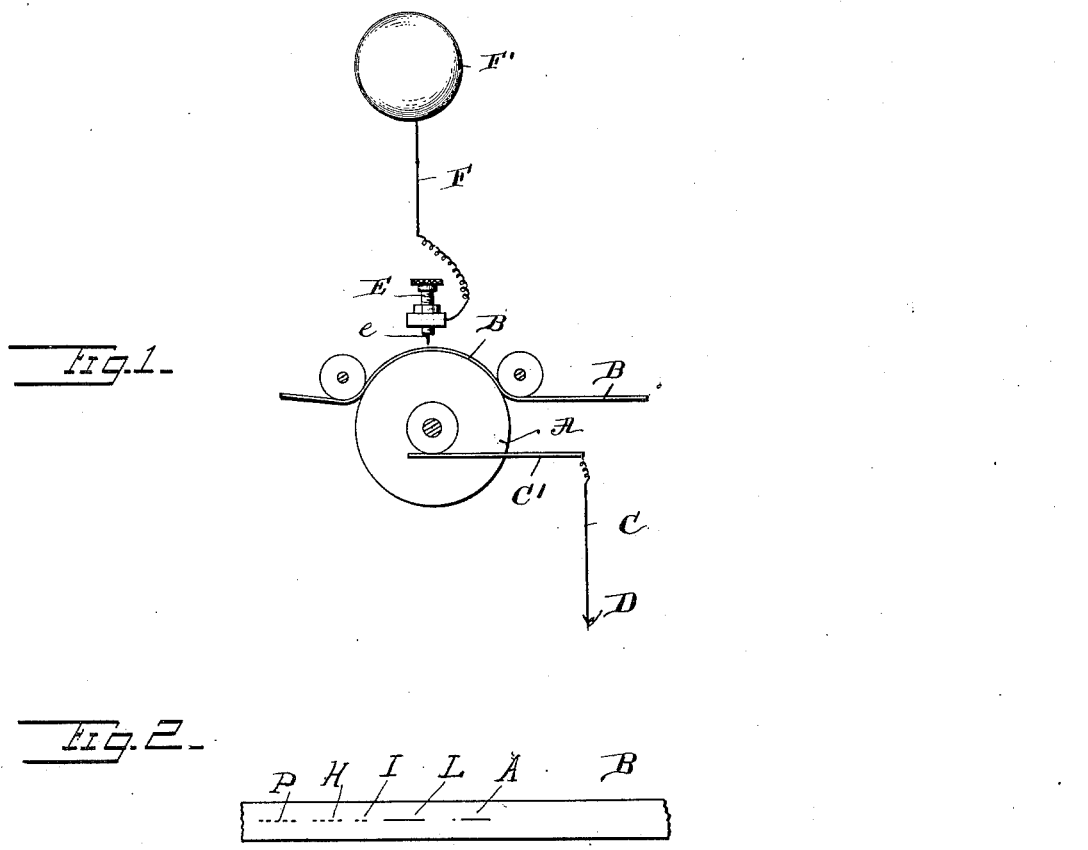

UNITED STATES PATENT OFFICE.

ISIDOR KITSEE, OF PHILADELPHIA, PENNSYLVANIA, ASSIGNOR TO CHARLES E. WILSON, OF SAME PLACE.

WIRELESS OR SPACE TELEGRAPHY.

SPECIFICATION forming part of Letters Patent No. 657,222, dated September 4, 1900.

Application filed May 20, 1899. Renewed March 12, 1900. Serial No. 8,399. (No model.)

*To all whom it may concern:*

Be it known that I, ISIDOR KITSEE, of the city and county of Philadelphia, State of Pennsylvania, have invented certain new and useful Improvements in Wireless or Space Telegraphy, of which the following is a specification.

My invention relates to telegraphy, and has more special reference to wireless or space telegraphy.

The object of my invention is to record the messages with the aid of chemically-prepared paper.

In telegraphy with the aid of a continuous circuit the metallic drum on which the chemically-prepared paper rests is in electrical connection with the ground, and the conducting-stylus resting on the paper is in electrical connection with the line from which the messages are sent. Both, line as well as ground connection, are therefore electrically connected with each other through the interposition of the moist chemical paper. This electric contact is a necessity, and the recorder would not work if between the stylus and the paper a non-conducting material or dielectric—such, for instance, as mica, glass, or air—is interposed. In my experiments with space-telegraphy I endeavored to make use of this chemical recorder in the usual manner; but no matter how far or near the sending-station was placed from the receiving-station the air-transmitted electrical impulses would not leave any trace on the paper if the stylus were brought into electrical connection with the paper resting on the conducting-drum connected to the ground. After testing different arrangements I found that it was necessary to introduce an air-gap and allow the current to discharge through same either in the form of a spark or silent discharge. I therefore constructed a device with the following arrangement: On the drum proper, which, as usual, is connected with the ground, was placed the chemically-prepared paper; but the stylus was replaced by an adjustable screw, the point of which was at a distance of about two millimeters from the paper. Under this condition the apparatus worked satisfactorily. As a fluid I use potassium iodid, potassium bromid, dextrine, and water in the proportion of one part of the dextrine, eight parts of iodid, thirty-two parts of bromid, and about one hundred and twenty parts of water; but other proportions and other liquids may be used.

Referring to the drawings, Figure 1 is a diagrammatic view illustrating the electrical connection of the device. Fig. 2 is a plan view of the tape after it has passed through the device, showing the indication-marks "P," "H," "I," "L," "A."

A is the drum or wheel carrying the paper B. This drum or wheel is, through the arm C' and wire C, connected to the ground D. In proximity to the paper B is the adjustable screw E, provided with the point e, connected through the wire F with the aerial terminal F'.

Having now described my invention, what I claim as new, and desire to secure by Letters Patent, is—

1. In space telegraphy a receiving instrument consisting of a chemically-prepared paper resting on a metallic support connected to the ground in combination with the terminal of the aerial conductor secured in juxtaposition to, but not in actual contact with, said paper, and means for carrying successively, successive parts of said paper between said support and aerial conductor.

2. In telegraphy a receiving instrument consisting of a chemically-prepared paper in electrical contact with one terminal of the receiving-circuit, the other terminal of the receiving-circuit being separated from said chemically-prepared paper by the interposition of a non-conducting body, one terminal of the receiving-circuit being connected to the air-line and the other terminal of the receiving-circuit being connected to the ground.

3. A receiving instrument for current-waves of high intensity consisting of a chemically-prepared paper and metallic support connected to one terminal of the receiving-circuit, an adjustable screw connected to the other terminal of the receiving-circuit and means for carrying the paper between said support and screw, said paper being in contact only with one terminal of said circuit, the terminals being connected, one to the aerial conductor and one to the ground.

In testimony whereof I sign my name, in the presence of two subscribing witnesses, this 19th day of May, A. D. 1899.

ISIDOR KITSEE.

Witnesses:
 WALLACE B. ELDRIDGE,
 E. R. STILLEY.